Nov. 27, 1928.
G. P. LUCKEY
1,693,485
MECHANICAL DIFFERENTIAL MOVEMENT AND TACHOMETER EMBODIMENT
Filed May 20, 1925
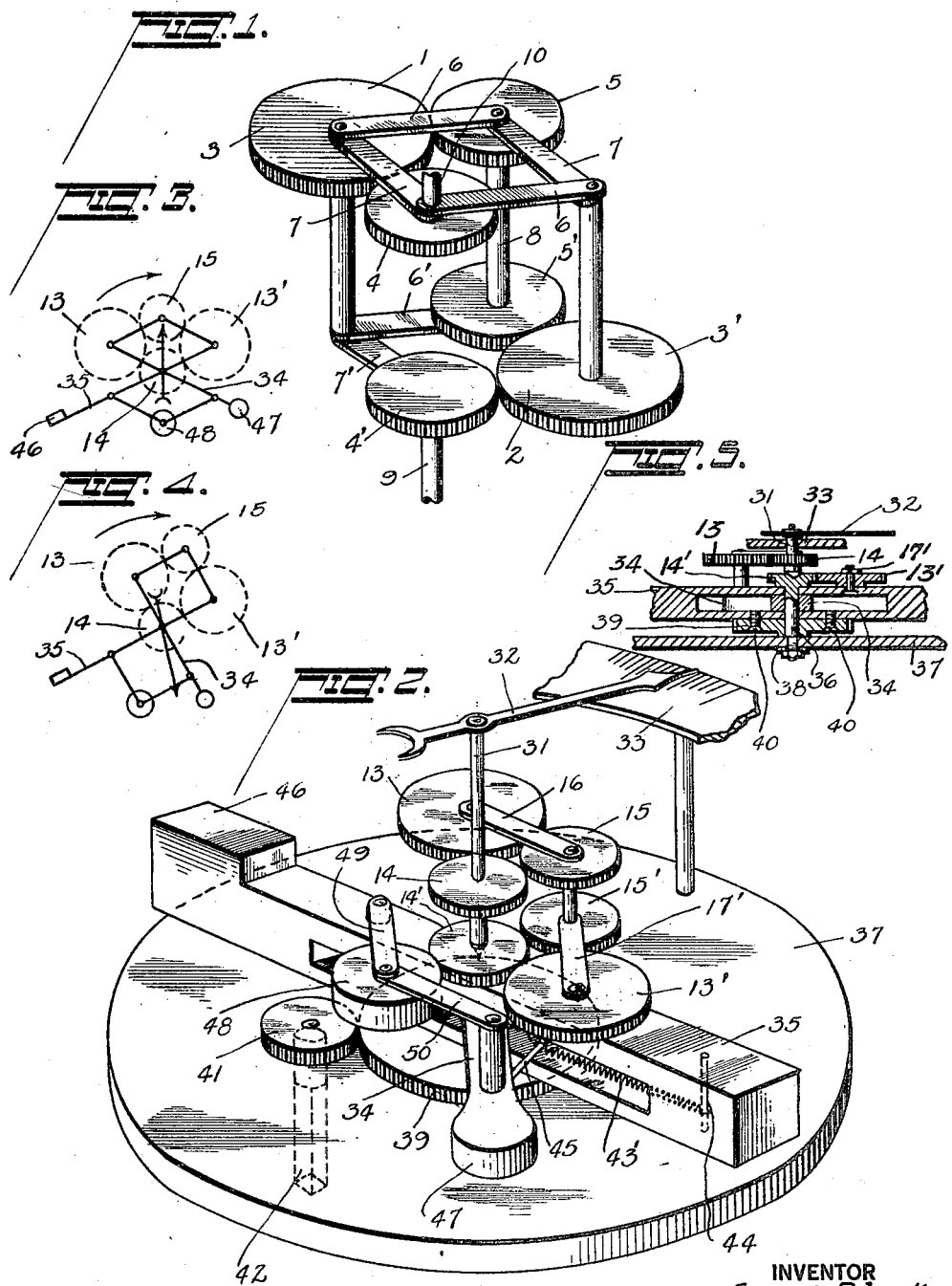
INVENTOR
GEORGE P. LUCKEY
BY *Robert H. Young*
ATTORNEY Patented Nov. 27, 1928.

1,693,485

UNITED STATES PATENT OFFICE.

GEORGE P. LUCKEY, OF DAYTON, OHIO.

MECHANICAL DIFFERENTIAL MOVEMENT AND TACHOMETER EMBODIMENT.

Application filed May 20, 1925. Serial No. 31,615.

This invention relates to a new mechanical movement by which relative motion between two shafts may be obtained. The shafts may be rotated relative to the system used to change their relative angular relation, or one of the shafts may be stationary and the system may be rotatable.

Another main object of the invention is the provision of a centrifugal tachometer operating on a differential movement arrangement. In the centrifugal differential tachometer, in accordance with my invention, a mass is provided, which in the particular form illustrated, consists of a gear of the differential together with its counterbalancing weight, this mass being adapted to act upon one of the three elements of the differential system so as to cause an indicator shaft to assume a position dependent upon the speed of rotation of the differential system. One of the elements of the differential system supports a plurality of the gears of the differential, both for bodily movement and for rotation about their own axes, these gears being counterbalanced by weights positioned properly upon the opposite side of the axis of rotation of the system, so that no unbalanced forces are obtained on the shaft supporting the system or mechanism as a whole.

A parallelogram arrangement of links supports the gears of the differential from a main supporting bar, which is centrally pivoted and which itself forms one of the sides of the parallelogram. A second parallelogram arrangement is provided to form a counterbalance for the first. The relative motion of the gear centers of the differential gear train is constrained by suitable springs, so that the movement of the indicator is proportional to the speed of rotation of the system. Other additional objects and advantages of my invention will be more fully set forth in the attached drawings, description and claims, which refer to one form chosen for purposes of illustration.

In the drawings, Fig. 1 is a perspective view of the mechanical movement made use of in my invention.

Fig. 2 is a perspective view of a tachometer of the centrifugal differential type in accordance with my invention.

Fig. 3 is a diagrammatic view corresponding to the positions of the links and gears as shown in Fig. 2.

Fig. 4 is a second diagrammatic view showing the links and gears in a changed relation, and Fig. 5 is a central vertical sectional view taken through the main supporting bar of the system.

Referring more particularly to the drawings, a parallelogram differential mechanical movement is shown in Fig. 1 as consisting of two parallel sets of spur gears, the gears being supported by means of pivoted links or arms arranged in parallelogram form so as to be freely movable. The two parallel sets are shown as an upper set 1 and a lower set 2, and each consisting of a central gear 3 and two end gears 4 and 5, which mesh with gear 3. The three gears of set 1 are interconnected by means of the parallel links 6—6 and 7—7 which are all of the same length to permit the gears to engage at all times while the distance between the centers of opposite gears may be changed. The lower set of gears 2, consisting of the central gear 3' and the two end gears 4' and 5', are likewise supported by means of the links 6' and 7'. The two end gears 5 and 5' of the two sets are rigidly interconnected by means of the shaft 8 so that gear 4', which is rigid with the shaft 9, which in this case may be considered a driving shaft, is geared by means of the differential gear system to gear 4, which is rigid with the shaft 10 and may be considered as a driven shaft. The two shafts 9 and 10 may be differentially varied as far as their relative angular positions are concerned while still rotating, by merely varying the relation between the links of the parallelogram system either manually or automatically as desired. This will be clear when it is observed that gears 4' and 5' may be moved away from each other, such movement causing a change in the velocities of the two gears.

The shaft 9 may be a driving shaft so as to drive shaft 10 by means of the differential mechanical movement just described, or one or both of these shafts may be normally stationary, the two shafts being varied relatively by means of a change in the parallelogram link arrangement. The shaft 10 may form an indicator shaft to be attached to a pointer to indicate the speed of rotation of the entire differential gears, which is itself rotated through a suitable connection to a shaft, the speed of which is to be measured. In such case the shaft 9 would be stationary and a spring provided to maintain the relation of the gear centers of the train of gears, the force of the spring being overcome by the centrifugal force acting on the gears 5 and 5' together with their supporting links or arms. The centrifugal force on the gears 5 and 5' will of course vary as variations of the distance between their axis of rotation and the axis of the shafts 9 and 10.

Such an adaptation as just described, in which the link differential gear is applied to a differential centrifugal tachometer, is shown in Fig. 2. Gears 3, 4 and 5 of the top set of gears of the movement are shown in Fig. 2 at 13, 14 and 15 respectively, and the lower set of gears of the differential train of the tachometer is shown at 13', 14' and 15' respectively. A single top link 16 interconnects gears 13 and 15 and a single lower link 17' interconnects gears 13' and 15'. Gear 14 is rigid with an indicator shaft 31 bearing a pointer 32 operating along a scale 33, which is graduated for indicating the speed of movement of the shaft driving the entire differential system. The lower end of shaft 31 which extends through gear 14, is provided with a point in bearing relation with a bearing in top of the gear 14'. The gears 14 and 14' are in nowise interconnected except through the meshing of the gear train.

Instead of providing a link for merely interconnecting gears 13 and 14 as the link 7 shown in Fig. 1, the gear 13 is pivoted on an axis fixed in a bar 34 which is positioned parallel to the link 17', and is centrally pivoted at the center of the main axis of rotation of the entire differential system to the center of a main supporting bar 35. The bar 35 forms a support for the axis of the gear 13' and takes the place of the lower link 6' of Fig. 1. The bar 35 is provided with a central slot within which the bar 34 is free to move except as constrained by a central pivotal connection between these two bars. Both of the bars 34 and 35 are pivotally mounted on a stub shaft 36 which is rigid with the gear 14' (see Fig. 5) and both the gear 14' and the shaft 36 are held in fixed position in relation to the main face plate 37 by means of the nut 38. It will now be clear that since gear 14' is fixed the entire differential system may be rotated about the main central axis of the system without causing movement of the gear 14 or the pointer except when an outward movement of the gears 15 and 15' occurs, due to centrifugal force acting upon these two gears, at which time the outward movement of these gears will be indicated by a rotational movement of the gear 14 to move the pointer correspondingly.

The main supporting bar 35 is fixed to a large bottom gear 39 by means of the screws 40 and the main gear 39 is freely rotatable upon the shaft 36 so that it may be driven by a pinion 41 with which it meshes, and which is driven by a shaft 42 adapted to be connected to a shaft whose speed is to be measured. A suitable bearing is provided at 43 which may be held in the top plate of the case, the lower plate being the bottom plate 37 shown in the figures. When shaft 42 is driven the gear 39 will be rotated and therewith the supporting bar 35, thus causing the entire differential system to move as a whole about the axis of the shaft 36. Since gear 14' is stationary, the gears of the two sets of gears will roll around on their own axes without causing any movement of the indicator shaft 31, unless the gears 15 and 15' are moved outwardly away from the center of rotation. This is exactly what occurs however, since centrifugal force acts upon these gears 15 and 15' and the degree of angular change between the links of the parallelogram is dependent upon a function of the speed. Since gears 15, 15' can move outwardly only when the scissors like members 46, 47 are moved away from each other it will be apparent that outward movement of the gears 15 and 15' is restrained by means of a spring 43' which is connected at one end to a pin 44 and at the other end is connected to a projection 45 of the arm 34. This projection is provided so that the spring 43' which is of the helical tension type, may be positioned radially with respect to the main axis so that the scale 33 may be made uniform from zero or from any amount above zero to the maximum limit desired.

In order to prevent an unbalance due to high speeds of rotation of the system about the main central axis, the weight of the gear 13' is counterbalanced by a counterbalancing weight 46 which is provided at the end of the supporting bar 35. This weight 46 should have the same moment about the main central axis as the gear 13' which it balances. The gear 13 is likewise balanced by an opposite similar weight spaced the same distance from the main central axis as the gear 13 or as in the case illustrated, may take the form of an additional weight 47 provided on the end of the arm 34 to have a moment sufficient to balance the moment of the gear 13. The gears 15 and 15' together with the links 16 and 17' have collectively varying unbalanced moment about the main central axis of the system, dependent upon the speed of the rotation of the system. To counterbalance this moment, a counterbalancing disk or weight 48, having a mass equivalent to the combined mass of gears 15 and 15' together with their connecting shaft, is provided, and this mass 48 is connected by links 49 and 50 to the bars 35 and 34 respectively. The arms 49 and 50, together with the two bars form a parallelogram similar to the parallelogram formed by the links 16 and 17' with the bars 34 and 35. The links 49 and 50 are equal in length to the links 17' and 16 as the counterbalancing mass 48 exactly equals the mass of the combined gears 15 and 15', but the mass of the weight 48 and the lengths of the links may be varied proportionately so that the moment of the counterbalancing mass and its links is maintained equal to that of the gears and links which they counterbalance. The counterbalancing mass 48 will assist the mass of the gears 15, 15' in overcoming the tension of the spring 43' since the centrifugal force operates upon these two masses equally, and although the two moments of unbalance about the main central axis neutralize each other as regards that axis, they combine together in overcoming the spring tension to operate the indicating needle 32.

Figs. 3 and 4 show the relative positions of the two pair of gears in two positions of movement, Fig. 3 corresponding to that shown in detail in Fig. 2 in which the centrifugally actuated gears and the counterbalance 48 are close to the center of rotation of the system. Fig. 4 shows a changed position corresponding to a high speed position, in which the centrifugally actuated gears 15 and 15' and the counterbalance 48 are positioned remotely from the axis of the system, resulting in a change of the angular position of the needle.

I am aware that my invention may be put to various uses and is susceptible of various modifications and changes, and I therefore do not desire to be limited to the particular construction which has been chosen for purposes of illustration of my invention.

I claim:

1. A mechanical movement for obtaining angular change in a shaft, comprising a stationary gear, a system of gears, in mesh therewith, and a system of links arranged in parallelogram form and supporting the said gears at the corners of the parallelogram, means mounting said system of gears and links for rotational movement as a whole about said shaft and means yieldingly engaging said ring system and said mounting means tending to restrict the movement of said shaft, so that centrifugal force acting on the said gears will vary the shape of the link parallelogram to cause a movement of said shaft.

2. A mechanical movement for obtaining angular movement of a shaft, comprising a stationary gear aligned with said axis, a system of spur gears arranged in two parallel trains in mesh therewith, and a system of links arranged in double parallelogram form and supporting the said gears at the corners of the parallelogram, means mounting the said system of said gears and links for rotational movement about said shaft and spring means engaging said ring system with said mounting means tending to restrict the movement of said shaft, so that centrifugal force acting on said gears will vary the shape of the link parallelogram to cause a movement of said shaft.

3. In a mechanical movement for obtaining angular change in a shaft comprising a stationary gear, a system of gears arranged in two parallel trains in mesh therewith, and a system of links arranged in parallelogram form and supporting the said gears at the corners of the parallelogram, means mounting said system of gears and links for rotational movement as a whole about said shaft, a spring inter-connecting said ring system and said mounting means, so that centrifugal force acting on the said gears will vary the shape of the link parallelogram to cause a movement of said shaft, and counterbalancing means for said gears and links to equalize the centrifugal force of the entire rotating movement about the said axis.

4. A mechanical movement for obtaining a relative angular change between two aligned members in a speed responsive device, comprising a system mounted to rotate as a whole and consisting of a series of links arranged in parallelogram form, a system of gears partly supported by said links and interconnecting said members, said system being mounted to rotate about the axis of said members so that centrifugal force on said gears moves said links to vary the shape of the parallelogram, means resisting such change of parallelogram shape and an operated means moved by relative angular change between said aligned members.

5. A mechanical movement for obtaining relative angular change between two aligned members in a speed responsive device comprising a system mounted to rotate as a whole and consisting of a series of links arranged in a double superposed parallelogram form, a system of gears partly supported by said links in two adjacent planes and interconnecting said members, said system being mounted to rotate about the axis of said members, so that centrifugal force on one of said gears moves said links to vary the shape of the parallelogram, spring means resisting such change of parallelogram shape, counterbalancing weights for said gears to balance the centrifugal force of said gears about the axis of rotation of said system, and an operating means moved by relative angular change between said aligned members.

6. A speed responsive device for obtaining angular change in an indicator shaft dependent upon the speed of a driven shaft comprising a stationary gear, a system of spur gears in mesh therewith, and a system of links arranged in parallelogram form and supporting the said gears at the corners of the parallelogram, means mounting said system of gears and links for rotational movement about an axis, so that centrifugal force acting on some of said gears will vary the shape of the link parallelogram to cause a movement of said shaft, spring means acting on said links to oppose the centrifugal force on the said gears, and a second series of links forming a second parallelogram on the other side of the said axis of rotation to equalize the centrifugal force of the said gears about the said axis.

7. In a speed measuring device, in combination, a differential gear having one element of the differential driven proportional to a reference speed and rotatable about a main central axis of the differential, a rotating mass fastened to said one element to rotate about the said main central axis of the differential and having movement relative to said axis so that centrifugal force acts to move said mass outwardly from said axis, means acting on said mass to balance said centrifugal force and an indicator actuated by movement of said mass in accordance with the speed of said rotatable element.

8. In a speed responsive device, in combination, a differential gear having one element of the differential driven proportional to a reference speed and rotatable about a main central axis of the differential, a rotating mass fastened to said one element to rotate about the said main central axis of the differential, and having movement relative to said axis and pivotally connected to said one element, so that centrifugal force acts to move said mass outwardly from axis, spring means acting on said mass to balance said centrifugal force, and means forming a second element of the differential and actuated by movements of said mass in accordance with the speed of said rotatable element, one of said elements supporting a plurality of the gears of the differential for bodily movement and rotation.

9. In a speed responsive device, in combination, a differential gear having one rotatable element of the differential driven proportionately to a reference speed and rotatable about a main central axis of the differential, a rotating mass fastened to said rotatable element to rotate about the said main central axis of the differential, and having movement relative to said axis and pivotally connected to said rotatable element, so that centrifugal force acts to move said mass outwardly from said axis, spring means acting on said mass to balance said centrifugal force, and an indicating means forming a second element of the differential and actuated by movements of said mass in accordance with the speed of said rotatable element.

10. In a speed responsive device, in combination, a differential gear having one rotatable element of the differential driven proportional to a reference speed and rotatable about a main central axis of the differential and supporting a plurality of the gears of the differential for bodily movement and rotation, a rotating mass forming a part of said differential fastened to said rotatable element to rotate about the said main central axis of the differential and having movement relative to said axis and pivotally connected to said rotatable element by means of links so that centrifugal force acts to move said mass outwardly from said axis, spring means acting on said mass to balance said centrifugal force, and an indicating means forming a second element of the differential and actuated by movements of said mass in accordance with the speed of said rotating element.

11. The speed responsive device as set forth in claim 9, in which the rotating mass consists of a gear of the differential and an opposed counterweight for the gear mounted on the opposite side of the said main central axis of the differential, said gear and said counterbalance being both connected by links to said rotatable element.

12. The speed responsive device as set forth in claim 9, in which the rotating mass consists of a gear of the differential and an opposed counterweight for the gear mounted on the opposite side of the said main central axis of the differential, said gear and said counterbalance being both connected by links to said rotatable element, said rotatable element consisting of a centrally pivoted bar to which one end of said spring means is connected.

In testimony whereof I affix my signature.

GEORGE P. LUCKEY.